(12) United States Patent
Hanlon et al.

(10) Patent No.: US 8,087,619 B2
(45) Date of Patent: Jan. 3, 2012

(54) ACTIVE CONTROL STICK ASSEMBLY INCLUDING TRACTION DRIVE

(75) Inventors: Casey Hanlon, Queen Creek, AZ (US); Dave Eschborn, Gilbert, AZ (US)

(73) Assignee: Honeywell International, Inc., Morristown, NJ (US)

( * ) Notice: Subject to any disclaimer, the term of this patent is extended or adjusted under 35 U.S.C. 154(b) by 743 days.

(21) Appl. No.: 12/182,839

(22) Filed: Jul. 30, 2008

(65) Prior Publication Data

US 2010/0025539 A1    Feb. 4, 2010

(51) Int. Cl.
   *B64C 13/00*    (2006.01)
   *B64C 19/00*    (2006.01)
(52) U.S. Cl. ........................................ 244/223
(58) Field of Classification Search ............ 244/221, 244/223, 228, 229, 234, 236
   See application file for complete search history.

(56) References Cited

U.S. PATENT DOCUMENTS

| | | | |
|---|---|---|---|
| 4,782,723 A | 11/1988 | Kraus | |
| 4,918,344 A | 4/1990 | Chikamori et al. | |
| 5,027,023 A | 6/1991 | Koivikko | |
| 5,125,602 A * | 6/1992 | Vauvelle | 244/223 |
| 5,931,759 A | 8/1999 | Otaki et al. | |
| 6,067,077 A | 5/2000 | Martin et al. | |
| 6,104,382 A | 8/2000 | Martin et al. | |
| 6,201,533 B1 | 3/2001 | Rosenberg et al. | |
| 6,373,465 B2 * | 4/2002 | Jolly et al. | 345/156 |
| 6,429,849 B1 | 8/2002 | An et al. | |
| 6,904,823 B2 | 6/2005 | Levin et al. | |

FOREIGN PATENT DOCUMENTS

WO    WO 92/07756    *  5/1992

* cited by examiner

*Primary Examiner* — Rob Swiatek
(74) *Attorney, Agent, or Firm* — Ingrassia Fisher & Lorenz

(57) ABSTRACT

An active control stick assembly. In one embodiment, the active control stick assembly includes a housing assembly, a control stick coupled to the assembly housing for rotation about at least a first rotational axis, a first artificial force feel (AFF) motor disposed in the housing assembly, and a first traction drive mechanically coupling the first AFF motor to the control stick. A controller is operatively coupled to the first AFF motor. The controller is configured to selectively activate the first AFF motor to supply a torque through the first traction drive and acting on the control stick about the first rotational axis.

20 Claims, 5 Drawing Sheets

ACTIVE CONTROL STICK ASSEMBLY INCLUDING TRACTION DRIVE

TECHNICAL FIELD

The present invention relates generally to human-machine control interfaces and, more particularly, to an active control stick assembly including at least one traction drive suitable for deployment on an aircraft.

BACKGROUND

Modern aircraft are commonly equipped with one or more active control stick assemblies that permit a pilot to control various aspects of aircraft flight. As a first example, an inceptor-type control stick assembly may be deployed on a fixed wing aircraft and may include a control stick mounted to a gimbal assembly, which permits the control stick to be rotated about two substantially orthogonal rotational axes (i.e., the pitch and roll axes). During operation, one or more positions sensors monitor control stick movement and generate position signals indicative thereof. These position signals are then utilized to carry out corresponding adjustments to the aircraft's pitch and yaw (e.g., by altering the position of movable flight surfaces). As a second example, a collective-type control stick assembly may be deployed on a rotary wing aircraft and may include a control stick mounted to a housing for rotation about a single rotational axis. A position sensor monitors the angular position of the control stick and generates corresponding position signals, which may then be utilized to adjust aircraft lift.

There has been a recent migration in the aircraft industry toward "active" control stick assemblies capable of providing tactile cueing; i.e., haptic force feedback imparted to the control stick indicative of the aircraft's current flight parameters. In general, such active control stick assemblies include at least one artificial force feel (AFF) motor (e.g. a brushless direct current motor) that is selectively energized by a controller. The AFF motor is mechanically coupled to the control stick by a speed reducer, which is conventionally either a gearbox or a harmonic drive. When energized by the controller, the AFF motor drives through the speed reducer to exert a controlled torque on the control stick about one or more of the rotational axes. In this manner, the active control stick assembly generates haptic force feedback, which may be varied by commands from the Flight Control Computers, commensurate with current aircraft attitude and flight conditions.

Although providing the pilot with feedback in a rapid and intuitive manner, conventional active control stick assemblies are limited in certain respects. Active control stick assemblies employing harmonic drive speed reducers impart desirable feel characteristics to control stick movement; e.g., a noticeable smoothness as a pilot rotates the control stick about a rotational axis. However, such control stick assemblies have poor back drive efficiency and consequently may render movement of the control stick excessively difficult in the event of active control failure. By comparison, active control stick assemblies utilizing a gearbox to mechanically couple the AFF motor to the control stick provide little to no backlash; however, such active control assemblies commonly permit the transmission of undesirable forces to the control stick (e.g., vibrations resulting from the meshing of gear teeth within the gearbox), which may negatively impact the overall feel characteristics of the control stick assembly.

Accordingly, it would be desirable to provide an active control stick assembly that exhibits little to no backlash and that imparts desirable feel characteristics (e.g., smoothness) to the movement of the control stick. It would also be generally desirable for such an active control stick assembly to be compact, lightweight, and relatively inexpensive to implement. Other desirable features and characteristics of the present invention will become apparent from the subsequent Detailed Description and the appended claims, taken in conjunction with the accompanying drawings and this Background.

BRIEF SUMMARY

An active control stick assembly is provided. In one embodiment, the active control stick assembly includes a housing assembly, a control stick coupled to the assembly housing for rotation about at least a first rotational axis, a first artificial force feel (AFF) motor disposed in the housing assembly, and a first traction drive mechanically coupling the first AFF motor to the control stick. A controller is operatively coupled to the first AFF motor. The controller is configured to selectively activate the first AFF motor to supply a torque through the first traction drive and acting on the control stick about the first rotational axis.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

For the purposes of illustration, the following will generally describe a preferred embodiment wherein the active control stick assumes the form of an inceptor-type control stick assembly deployed on a fixed wing aircraft and rotatable about two substantially orthogonal rotational axes to control aircraft pitch and yaw. However, alternative embodiments of the active control stick may also be deployed on a rotary wing aircraft as a collective-type control stick assembly including a control stick that may be rotated about a single axis to control aircraft lift. Furthermore, while being particularly well-suited for deployment aboard a fixed wing or rotary wing aircraft, embodiments of the active control stick assembly may readily be deployed on other types of vehicles and machinery, such as excavation equipment, cranes, and the like.

Figure 1:
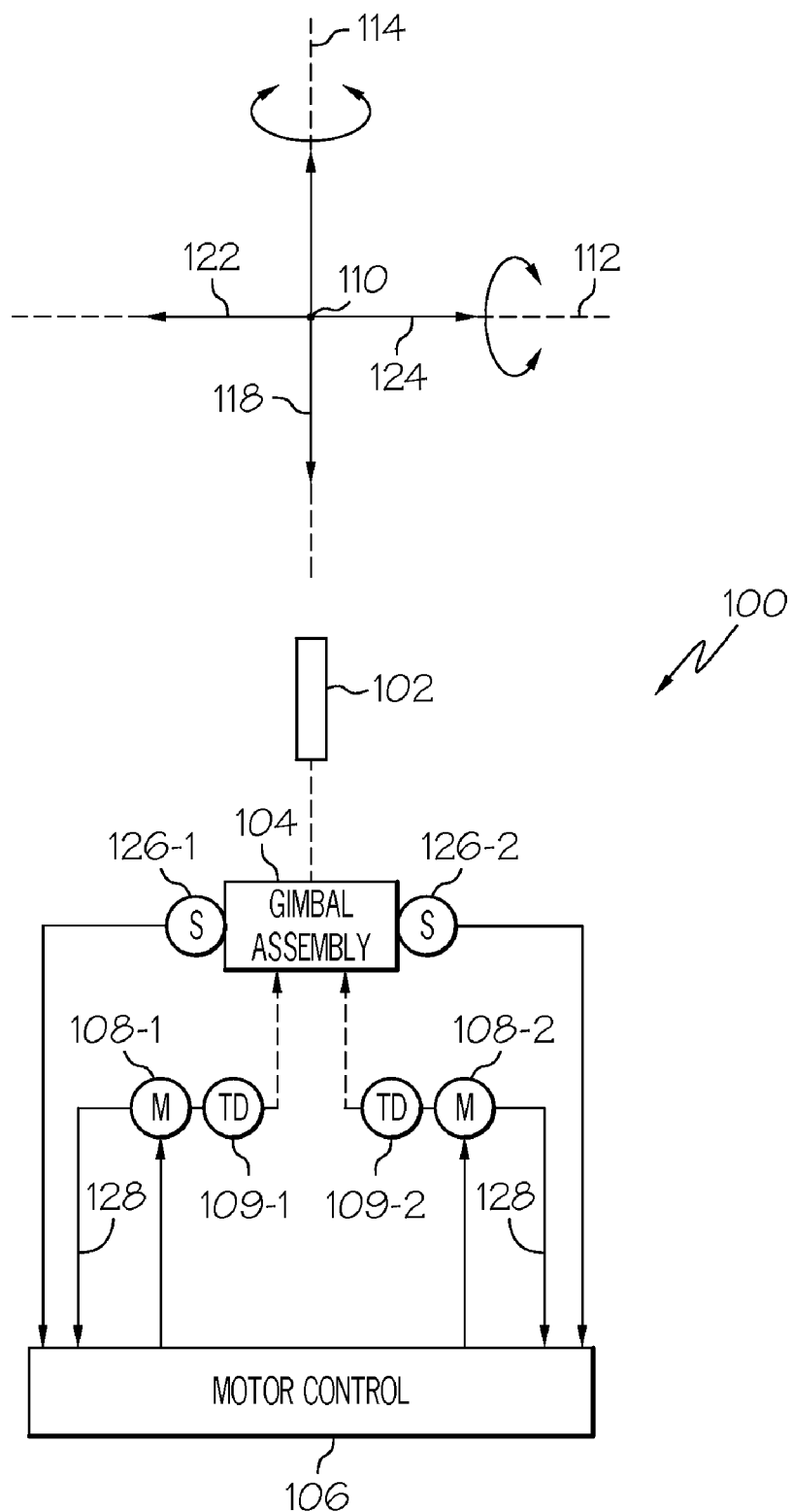
FIG. 1 is a simplified functional block diagram of an active control stick assembly in accordance with an exemplary embodiment.

FIG. 1 is a simplified functional block diagram of an active control stick assembly 100 in accordance with an exemplary embodiment. In this example, active control stick assembly 100 includes a control stick 102, a gimbal assembly 104, a controller 106, one or more artificial force feel (AFF) motors 108, and one or more traction drives 109. Control stick 102 is coupled to gimbal assembly 104 and is configured to move, in response to manual input from a pilot, from a null position (indicated in FIG. 1 at 110) in a plurality of movement directions. In particular, gimbal assembly 104 permits control stick 102 to be rotated about a first rotational axis 112 (the pitch axis) and a second rotational axis 114 (the roll axis). As indicated in FIG. 1, rotational axes 112 and 114 may be substantially perpendicular and co-planar. Control stick assembly 100 is preferably mounted within an aircraft's cockpit in a center stick or side stick configuration. Further, control stick assembly 100 is preferably mounted such that gimbal assembly 104 rotates: (i) about first rotational axis 112 as a pilot moves control stick 102 in a forward direction or in an aft direction 118, and (ii) about second rotational axis 114 as a pilot moves the control stick in a left direction 122 or a right direction 124. It should also be understood that gimbal assembly 104 further permits control stick 102 to be moved in a combined forward-left direction, a combined forward-right direction, a combined aft-left direction, or a combined aft-right direction, and back to or through the null position.

Movement of the control stick 102 is sensed via a plurality of control stick sensors 126. Control stick sensors 126 may be coupled to control stick 102 directly or, instead, to another component of active control stick assembly 100 mechanically linked to control stick 102 (e.g., gimbal assembly 104). Control stick sensors 126 are preferably implemented utilizing any one of numerous known force sensors, position sensors, or both. Suitable force sensors include, but are not limited to, strain gage sensors, piezoelectric sensors, semiconductor sensors, and optical sensors; and suitable position sensors include, but are not limited to, linear variable differential transducers (LVDTs), rotary variable differential transducers (RVDTs), potentiometers, resolvers, and optical sensors. No matter the specific number and type of sensors 126, control stick sensors 126 are configured to generate control stick movement signals representative of control stick movement along first rotational axis 112 and second rotational axis 114. For example, and as shown in FIG. 1, a first position sensor 126-1 may be configured to generate control stick movement signals representative of a vector component of control stick movement along the first rotational axis 112, and a second position sensor 126-2 is configured to supply control stick movement signals representative of a vector component of control stick movement along the second rotational axis 114. Depending on the type of sensors, it will be appreciated that the control stick movement signals may be force signals, position signals, or a combination thereof.

During flight, position sensors 126 supply controller 106 with movement signals indicative of the positioning of and/or force applied to control stick 102. In response to these movement signals, controller 106 may selectively energize one or more AFF motors 108. In the exemplary embodiment shown in FIG. 1, active control stick assembly 100 includes first and second AFF motors 108-1 and 108-2, which are mechanically coupled to control stick 102 by way of first and second traction drives 109-1 and 109-2, respectively. Collectively, AFF motor 108-1 and traction drive 109-1 form a first artificial force feel actuator, and AFF motor 108-2 and traction drive 109-2 form a second artificial force feel actuator. When energized by controller 106, AFF motors 108 drive through traction drives 109 to apply a controlled torque to control stick 102 and thereby provide haptic force feedback to control stick 102 as described more fully below. Although AFF motors 108 may assume any suitable form (e.g., hydraulic motors, pneumatic motors, AC motors, etc.), AFF motors 108-1 and 108-2 each preferably assume the form of a multi-phase brushless DC motor. As such, current feedback and commutation signals 128 associated with each AFF motor 108 are supplied to controller 106. It will be appreciated that although controller 106 is depicted using a single functional block, its described functionality could be implemented utilizing multiple individual controllers, each associated with a different AFF motor 108.

Figure 2:
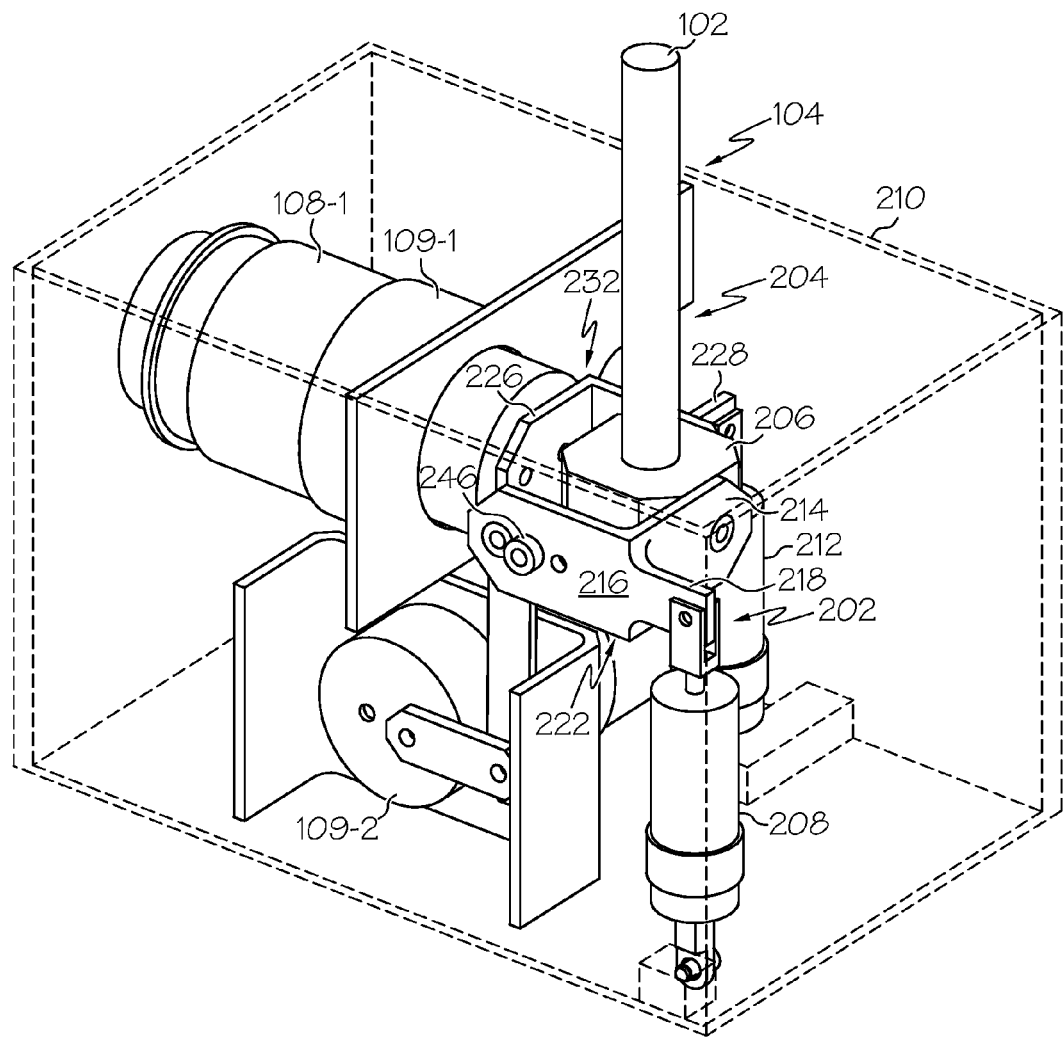
FIGS. 2 and 3 are first and second isometric views, respectively, of the active control stick assembly illustrated in FIG. 1.
Figure 3:
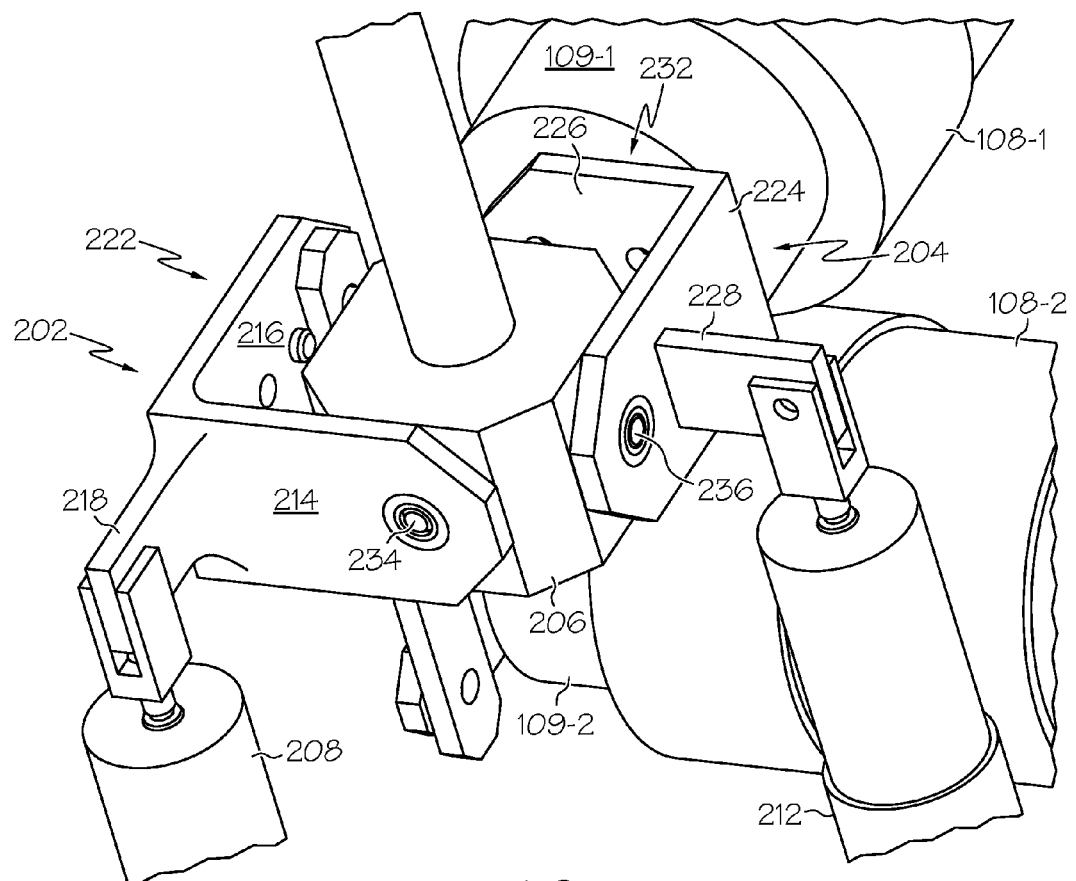
Figure 4:
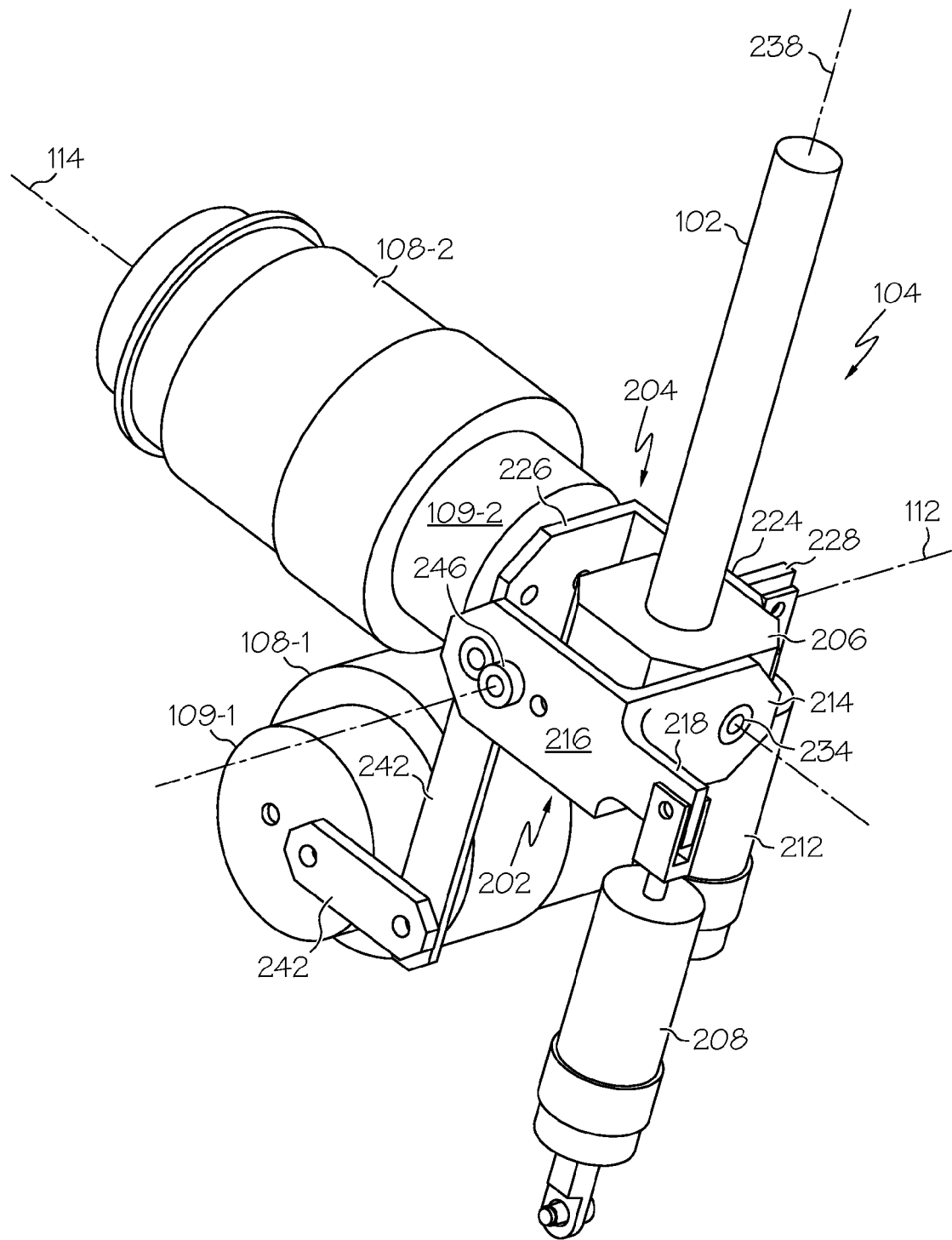
FIG. 4 is an isometric view of the active control stick assembly shown in FIGS. 1-3 illustrating the exemplary gimbal assembly in greater detail.

Referring collectively to FIGS. 2-4, a more detailed description of a specific exemplary embodiment of active control stick assembly 100 will now be provided. As shown most clearly in FIG. 2, gimbal assembly 104 comprises five main components: (i) a first bracket 202, (ii) a second bracket 204, (iii) a center body 206, (iv) a first centering mechanism 208, and (v) a second centering mechanism 212. Brackets 202 and 204, center body 206, and centering mechanisms 208 and 212 are each disposed within a main control stick assembly housing 210 (illustrated in phantom in FIG. 2). First and second brackets 202 and 204 are mounted within control stick assembly housing 210 such that first bracket 202 and second bracket 204 may rotate relative to control stick assembly housing 210 about first rotational axis 112 and second rotational axis 114, respectively (labeled in FIG. 4). First bracket 202 may be rotationally coupled to control stick assembly housing 210 utilizing a bearing assembly 246; and second bracket 204 may be coupled to second traction drive 109-2, which is fixed relative to control stick assembly housing 210.

As shown most clearly in FIG. 3, first bracket 202 includes a first arm 214, a second arm 216, and a third arm 218. First arm 214 and second arm 216 of first bracket 202 are disposed substantially perpendicular to each other to form a first substantially L-shaped section 222; and third arm 218 extends substantially perpendicular from first arm 214 in a direction opposite second arm 216. Second bracket 204 likewise includes a first arm 224, a second arm 226, and a third arm 228. Arms 224, 226, and 228 of bracket 204 are situated in the same manner as are arms 214, 216, and 218 of bracket 202; i.e., first arm 226 and second arm 228 are disposed substantially perpendicular to each other to form a second substantially L-shaped section 232, and third arm 228 extends substantially perpendicular from first arm 224 in a direction opposite second arm 226. However, in contrast to second bracket 204, third arm 218 of first bracket 204 and third arm 228 of second bracket 204 extend from different locations. This example notwithstanding, third arms 218, 228 could extend from the same location in alternative embodiments.

Center body 206 resides between first and second substantially L-shaped sections 222, 232. Opposing portions of center body 206 are rotationally coupled to first arms 214, 224 of the first and second brackets 202, 204. More specifically, and as shown most clearly in FIG. 4, center body 206 is rotationally coupled to: (i) first arm 214 of first bracket 202 along second rotational axis 114 via a first bearing assembly 234, and (ii) to first arm 224 of second bracket 204 along first rotational axis 112 via a second bearing assembly 236. As a result of this mechanical coupling, center body 206 may be rotated about first and second rotational axes 112, 114 from a null position (illustrated in FIGS. 2 and 4) to a plurality of control positions. Control stick 102 may be coupled to center body 206 such that the longitudinal axis of control stick 102 (represented in FIG. 4 by dashed line 238) is substantially perpendicular to the first and second rotational axes 112, 114 when in the null position. In alternative embodiments, control stick 102 may be coupled to center body 206 in such a manner that the longitudinal axis of the grip is either offset relative to the intersection of the two rotational axes and/or angled with respect to one or both of the rotational axes.

Control stick 102 is passively urged toward the null position (shown in FIGS. 2 and 4) by first and second centering mechanisms 208 and 212. In the illustrated exemplary embodiment, centering mechanisms 208 and 212 are mechanically coupled to control stick 102 through center body 206. That is, first centering mechanism 208 is coupled to third arm 218 of first bracket 202, and second centering mechanism 212 is coupled to third arm 228 of second bracket 204. First centering mechanism 208 is configured to supply a first centering force to bracket 202 that urges center body 206 toward the null position when center body 206 is rotated about first rotational axis 112 (FIG. 4). Similarly, second centering mechanism 212 is configured to supply a second centering force to bracket 204 that urges the center body 206 toward the null position when center body 206 is rotated about the second rotational axis 114 (FIG. 4). First and second centering mechanisms 208, 212 may be implemented utilizing springs or other such biasing means.

In the exemplary embodiment illustrated in FIGS. 2-4, first AFF motor 108-1 is mechanically coupled to first traction drive 109-1, which is mechanically coupled to second arm 216 of first bracket 202. Similarly, second AFF motor 108-2 is mechanically coupled to second traction drive 109-2, which is mechanically coupled to second arm 226 of second bracket 204. Traction drives 109-1 and 109-2 may be mounted to the housings of AFF motors 108-1 and 108-2, respectively, so as to be substantially co-axial therewith. Furthermore, the longitudinal axis of first traction drive 109-1 may be substantially perpendicular to the longitudinal axis of the second traction 109-2.

During operation of active control stick assembly 100, controller 106 selectively energizes first and second AFF motors 108-1 and 108-2 to provide haptic force feedback to control stick 102. When energized by controller 106 in this manner, first AFF motor 108-1 supplies a torque through traction drive 109-1 to center body 206 and about first rotational axis 112 (FIG. 4). Similarly, when energized by controller 106, second AFF motor 108-2 supplies a torque through traction drive 109-2 to center body 206 and about second rotational axis 112 (FIG. 4). Notably, traction drives 109-1 and 109-2 permit torque to be transmitted to center body 206, and therefore control stick 102, in a smooth and controlled manner. As a result, traction drives 109-1 and 109-2 impart desirable feel characteristics to (e.g., smoothness) to the movement of control stick 102. Furthermore, traction drives 109-1 and 109-2 generally exhibit little to no backlash. Traction drives 109-1 and 109-2 may or may not be substantially identical and each comprise a drive train including a plurality of roller elements (e.g., cones, cylinder, spheres, etc.) that frictionally engage one another to transmit torque from a mechanical input to a mechanical output. An example of a planetary traction drive suitable for use as traction drive 109-1 and/or traction drive 109-2 is described below in conjunction with FIG. 5.

Figure 5:
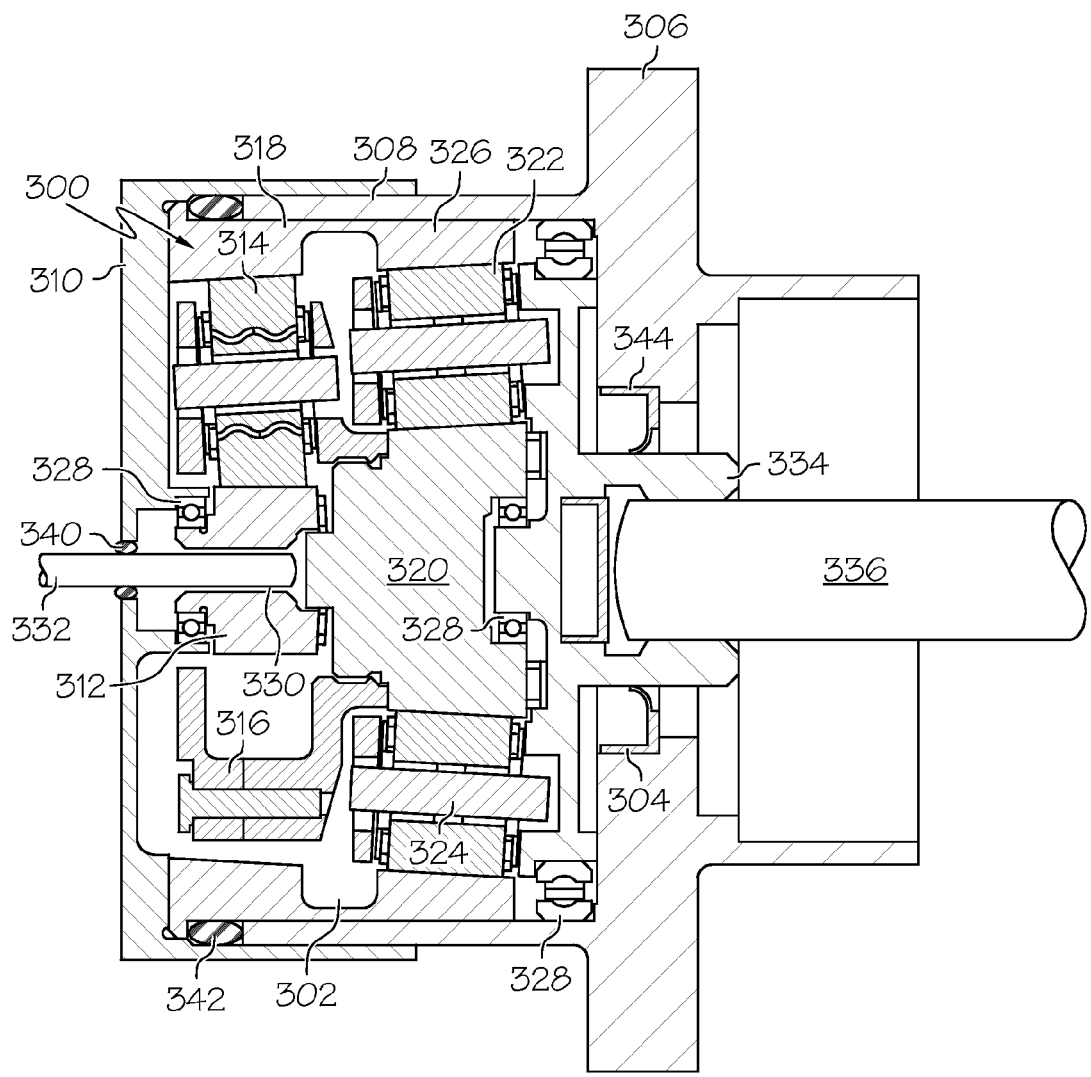
FIG. 5 is a cross-sectional view of an exemplary planetary traction drive suitable for use as one or more of the traction drive employed by the active control stick assembly shown in FIGS. 1-4.

The disposition of AFF motors 108 and traction drives 109, and the manner in which traction drives 109 are mechanically coupled to brackets 202 and 204, will inevitably vary amongst different embodiments. In one group of embodiments, AFF motor 108-1 and traction drive 109-1 may be disposed along rotational axis 112 (labeled in FIG. 4), and traction drive 109-1 may be connected directly to bracket 202; and AFF motor 108-2 and traction drive 109-2 may be disposed along rotational axis 114, and traction drive 109-2 may be connected directly to bracket 204. However, as indicated in FIG. 4, AFF motor 108-1 and traction drive 109-1 are preferably disposed along rotational axis 112, while AFF motor 108-2 and traction drive 109-2 are disposed remote from rotational axis 114. In this case, the mechanical output of traction drive 109-2 may be coupled second arm 216 of the first bracket 202 via one or more linkages 242; e.g., a first and second bar links joined together in a bellcrank arrangement. Advantageously, such an arrangement permits the effective reduction ratio to be increased along rotational axis 112. As a result, a similar or identical type of motor and traction drive may be utilized for AFF motors 108 and traction drives 109, respectively, while providing higher force outputs about rotational axis 112, which may serve as the pitch axis FIG. 5 is a cross-sectional view of an exemplary two stage planetary traction drive 300 suitable for use as traction drive 109-1 and/or traction drive 109-2 discussed above in conjunction with FIGS. 1-4. Planetary traction drive 300 is disposed within a cavity 302 provided within a housing assembly 304, which may be fixedly coupled to control stick assembly housing 210 (FIGS. 2-4). In the illustrated exemplary embodiment, housing assembly 304 comprises a main body 306 having a collar 308 to which an end cap 310 is attached. Planetary traction drive 300 includes a first sun roller 312, a first set of planetary rollers 314, a first stage carrier 316, a first stationary ring 318, a second sun roller 320, a second set of planetary rollers 322, a second stage carrier 324, and a second stationary ring 326. First set of planetary rollers 314 is disposed between and frictionally engages an external circumferential surface of first sun roller 312 and an internal circumferential surface of ring 318. Planetary rollers 314 are carried by first stage carrier 316, which is fixedly coupled to second sun roller 320. Second set of planetary rollers 322 is disposed between and frictionally engages an external circumferential surface of second sun roller 320 and an internal circumferential surface of ring 326. Planetary rollers 322 are supported by second stage carrier 324, which may serve as the mechanical output of traction drive 300 as described more fully below. If desired, first stationary ring 318 and second stationary ring 320 may be formed as a unitary cylindrical body as shown in FIG. 5.

First sun roller 312, planetary rollers 314, first stage carrier 316, second sun roller 320, planetary rollers 322, and second stage carrier 324 each rotate within housing assembly 304 during operation of traction drive 300. To this end, first sun roller 312, second sun roller 320, and second stage carrier 324 are rotatably supported in housing assembly 304 by a plurality of ball bearings 328. In contrast, first stationary ring 318 and second stationary ring 326 are fixedly coupled to housing assembly 304 and thus do not rotate during operation. In the illustrated exemplary embodiment, sun rollers 312 and 320 and planetary rollers 314 and 322 each have a substantially cylindrical shape; however, in alternative embodiments, the rolling elements included within traction drive 300 may assume conical, spherical, or other such geometries.

First sun roller 312 and second stage carrier 324 serve as the mechanical input and output of traction drive 300, respectively. First sun roller 312 may be mechanically coupled in any suitable manner to an artificial force feel motor such as AFF motor 108-1 or an artificial force feel motor such as AFF motor 108-2 described above in conjunction with FIGS. 1-4. For example, and as shown in FIG. 5, first sun roller 312 may be machined to include a splined central opening 330 that matingly receives a splined shaft 332, which is, in turn, mechanically coupled to the AFF motor. Similarly, second stage carrier 324 may be mechanically coupled to a control stick, such as control stick 102 (FIGS. 1-4), in any suitable manner. For example, second stage carrier 324 may be formed to include an annular collar 334 having a splined inner surface. Annular collar 334 may matingly receive a splined shaft 336 that is, in turn, coupled to control stick 102 via gimbal assembly 104 described above in conjunction with FIGS. 1-4.

In the illustrated exemplary embodiment, cavity 302 of housing assembly 304 is filled with a hydraulic or synthetic fluid, such as oil. Furthermore, housing assembly 304 is sealed utilizing a number of static or dynamic seals. In particular, a first dynamic seal 340 (e.g., an elastomeric o-ring) may be disposed between an outer surface of splined shaft 332 and an aperture provided through end cap 310, a second static seal 342 (e.g., an elastomeric o-ring) may be disposed between an inner surface of end cap 310 and an outer surface of stationary ring 318, and a third dynamic seal 344 (e.g., a polymeric cap) may be disposed between an inner surface of main housing 306 and an outer surface of collar 334 of second stage carrier 324.

During operation of planetary traction drive 300, an artificial force feel motor (e.g., AFF motor 108-1 or 108-2 shown in FIGS. 1-4) imparts rotary motion to splined shaft 332. This causes sun roller 312 to rotate, which, in turn, causes planetary rollers 314 and first stage carrier 316 to rotate. The rotation of first stage carrier 316 drives the rotation of sun roller 320 and planetary rollers 322. As planetary rollers 322 rotate, so too does second stage carrier 324. As noted above, second stage carrier 324 serves as the mechanical output of traction drive 300 and may be coupled to a control stick (e.g., control stick 102 shown in FIGS. 1-4) via splined shaft 336; e.g., splined shaft 336 may be fixedly coupled to a component of gimbal assembly 104, such as bracket 202 or bracket 204, in the above described manner. Thus, when so driven by an AFF motor, traction drive 300 imparts a controlled torque to a control stick about a rotational axis in a smooth and controlled manner. Traction drive 300 is preferably configured such that the rotational speed of its mechanical output (e.g., second stage carrier 324) is less than rotational speed of its mechanical input (e.g., first sun roller 312). Stated differently, traction drive 300 functions as a speed reducer and may have a reduction ratio of, for example, 15:1. Unlike conventional harmonic drives, traction drive 300 provides little to no backlash. Furthermore, traction drive 300 lacks toothed gearing that may produce undesirable vibration forces during operation and consequently imparts desirable feel characteristics (e.g., improved smoothness) to the movement of the control stick.

It should thus be appreciated that there has been provided an active control stick assembly including at least one traction drive that provides exceptional back drive efficiency while simultaneously providing desirable control stick feel characteristics. Relative to conventional control stick assemblies, embodiments of the active control stick assembly are relatively compact, lightweight, and relatively inexpensive to implement. In the above-described exemplary embodiment, each traction drive was mechanically coupled to the control stick through a dual bracket gimbal assembly. This example notwithstanding, it should be appreciated that various other types of gimbal assemblies may be employed. Furthermore, in certain embodiments, the control stick may be coupled to a housing for rotation about one or more rotational axes without the use of a gimbal assembly.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. An active control stick assembly, comprising:
   a housing assembly;
   a control stick coupled to the housing assembly for rotation about at least a first rotational axis;
   a first artificial force feel (AFF) motor disposed in the housing assembly;
   a first traction drive mechanically coupling the first AFF motor to the control stick; and
   a controller operatively coupled to the first AFF motor, the controller configured to selectively activate the first AFF motor to supply a torque through the first traction drive to the control stick about the first rotational axis.

2. An active control stick assembly according to claim 1 wherein the traction drive comprises a planetary traction drive.

3. An active control stick assembly according to claim 1 wherein the first traction drive is disposed along the first rotational axis.

4. An active control stick assembly according to claim 1 wherein the traction drive comprises:
   a mechanical input coupled to the first AFF motor; and
   a mechanical output coupled to the control stick, the traction drive configured such that the rotational speed of the mechanical output is less than the rotational speed of the mechanical input.

5. An active control stick assembly according to claim 1 wherein the control stick is further configured to rotate about a second rotational axis substantially orthogonal to the first rotational axis.

6. An active control stick assembly according to claim 5 further comprising:
   a second AFF motor disposed in the housing assembly; and
   a second traction drive mechanically coupling the second AFF motor to the control stick, the controller configured to selectively activate the second AFF motor to supply a torque through second first traction drive and to the control stick about the second rotational axis.

7. An active control stick assembly according to claim 6 further comprising a gimbal assembly mechanically coupled between the control stick and each of the first AFF motor and the second AFF motor.

8. An active control stick assembly according to claim 7 wherein the gimbal assembly comprises:
   a first bracket coupled between the control stick and the first traction drive; and
   a second bracket coupled between the control stick and the second traction drive.

9. An active control stick assembly according to claim 8 wherein the second traction drive is disposed remote from the second rotational axis.

10. An active control stick assembly according to claim 9 further comprising at least one linkage mechanically coupling the second traction drive to the second bracket.

11. An active control stick assembly according to claim 8 further comprising a centerbody fixedly coupled to an end portion of the control stick and residing between the first bracket and the second bracket.

12. An active control stick assembly according to claim 8 further comprising:

a first centering mechanism coupled between the housing assembly and the first bracket; and a second centering mechanism coupled between the housing assembly and the second bracket.

13. An active control stick assembly according to claim 1 further comprising at least one position sensor operatively coupled to the controller and configured to supply thereto indicative of control stick movement.

14. An active control stick assembly for piloting an aircraft, the active control stick assembly comprising:

a housing assembly;

a control stick mounted to the housing assembly and configured for rotation about at least a first rotational axis;

a position sensor coupled to the control stick and configured to monitor the position thereof;

a first artificial force feel (AFF) motor disposed in the housing assembly;

a controller operatively coupled to the position sensor and to the first AFF motor, the controller configured to selectively energize the first AFF motor; and a first traction drive mechanically coupling the first AFF motor to the control stick, the first AFF motor driving through the first traction drive to produce active force feedback about the first rotational axis of the control stick when the first AFF motor is energized by the controller.

15. An active control stick assembly according to claim 14 wherein the first traction drive is a planetary traction drive.

16. An active control stick assembly according to claim 14 further comprising:

a second AFF motor disposed in the housing assembly and operatively coupled to the controller; and a second traction drive mechanically coupling the second AFF motor to the control stick, the second AFF motor driving through the second traction drive to produce active force feedback about a second rotational axis of the control stick when the second AFF motor is energized, the second rotational axis substantially orthogonal to the first rotational axis.

17. An active control stick assembly for piloting an aircraft, the active control stick assembly comprising:

a housing assembly;

a control stick;

a gimbal assembly coupling the control stick to the housing assembly such that the control stick is rotatable about a first rotational axis and a second rotational axis;

a first artificial force feel (AFF) motor disposed in the housing assembly;

a first planetary traction drive mechanically coupling the first AFF motor to the gimbal assembly, the first AFF motor driving through the first traction drive to selectively produce active force feedback along the first rotational axis of the control stick;

a second artificial force feel (AFF) motor disposed in the housing assembly; and a second planetary traction drive mechanically coupling the second AFF motor to the gimbal assembly, the second AFF motor driving through the second traction drive to selectively produce active force feedback along the second rotational axis of the control stick.

18. An active control stick assembly according to claim 17 wherein the first planetary traction drive and the first AFF motor are substantially co-axial.

19. An active control stick assembly according to claim 18 further comprising at least one linkage mechanically coupling the second planetary traction drive to the gimbal assembly.

20. An active control stick assembly according to claim 17 wherein the longitudinal axis of the first planetary traction drive and is substantially perpendicular to the longitudinal axis of the second planetary traction drive.

* * * * *